United States Patent [19]

Meiners

[11] Patent Number: 5,142,794

[45] Date of Patent: Sep. 1, 1992

[54] PROCESS AND APPARATUS FOR DRYING GRAIN

[76] Inventor: Elmo R. Meiners, Box 64, Anchor, Ill. 61720

[21] Appl. No.: 583,036

[22] Filed: Sep. 14, 1990

Related U.S. Application Data

[63] Continuation-in-part of Ser. No. 392,741, Aug. 11, 1989, abandoned.

[51] Int. Cl.⁵ ............................................. F26B 3/00
[52] U.S. Cl. ............................................. 34/35; 34/85; 34/225
[58] Field of Search ............. 34/32, 85, 225, 230, 34/48, 52, 56, 35

[56] References Cited

U.S. PATENT DOCUMENTS

| | | |
|---|---|---|
| 2,777,212 | 1/1957 | McOmber . |
| 3,314,159 | 4/1967 | Betz . |
| 3,943,636 | 3/1976 | Sietmann et al. ............ 34/52 X |
| 4,142,302 | 3/1979 | Primus ............................ 34/31 |
| 4,253,825 | 3/1981 | Fasano . |
| 4,260,368 | 4/1981 | Karlsson . |
| 4,330,946 | 5/1982 | Cournega . |
| 4,346,523 | 8/1982 | Ronning . |
| 4,499,911 | 1/1985 | Johnson . |
| 4,676,007 | 6/1987 | Good . |
| 4,780,965 | 11/1988 | Graten et al. . |
| 4,800,653 | 1/1989 | Steffen ............................ 34/48 X |

*Primary Examiner*—Henry Bennett
*Attorney, Agent, or Firm*—Stephen T Belsheim

[57] ABSTRACT

A process, and its related apparatus, for pre-treating corn or other grain, which makes use of exhaust air from a conventional dryer by conveying the exhaust air from the dryer through a heater and into a steeping container. The grain in the steeping container is slowly and evenly pre-treated as air passes through a perforated floor in the steeping container and through the grain or corn, thereby, yielding grain with uniform moisture levels and uniform quality.

12 Claims, 1 Drawing Sheet

PROCESS AND APPARATUS FOR DRYING GRAIN

This patent application is a continuation-in-part of Ser. No. 07/392,741 filed Aug. 11, 1989, now abandoned.

BACKGROUND OF THE INVENTION

The present invention relates generally to apparatus and processes for drying grain, and more particularly to an apparatus and process for preheating corn to be dried in a corn dryer by utilizing waste (or exhaust) heat from the corn dryer.

Cereal grains, particularly corn, are often harvested with a moisture level in the grain that is too high to permit storage of the grain without damage. Corn is often harvested at 18 to 38 percent moisture and must be dried to 14 to 15.5 percent moisture for safe storage. In order to achieve this drying quickly enough to prevent spoilage of the grain, artificial drying processes are often employed that utilize heated air which is forced through the grain in either batch or continuous flow arrangements.

The quality of the grain is more greatly affected by the process of drying than by any other grain handling operation. The main dryer operating factors affecting grain quality are air temperature, airflow rate and residence time. The three conditions together determine the drying rate and maximum temperature of the grain being dried, and establishes the final quality of the dried lot. It is known that excessively rapid drying of moist grain causes stress cracking of the kernel, which can make the grain more susceptible to breakage during subsequent handling operations.

One method of reducing thermal shock to the corn kernel caused by rapid heating of the grain in the corn dryer is to pretreat the corn before it enters the corn dryer by preheating the corn. The temperature gradient created in the corn kernel in the corn dryer during rapid heating is thereby reduced, which in turn reduces stress cracking Thus, it would be desirable to provide a process, and its related apparatus, that provides for a more uniform preheating of corn prior to entry into the corn dryer per se, which is not detrimental to the quality of the corn. It would also be desirable to provide such a process and apparatus which is efficient in the use of energy during its operation.

SUMMARY OF THE INVENTION

The present invention generally involves a process and its related apparatus for pre-drying or pre-treating grain by feeding the grain into a steeping container and introducing warm, relatively dry air into the steeping container and passing the warm air through the grain therein to slowly and uniformly preheat the grain. After preheating, the grain is conveyed to a conventional corn dryer for final drying. The process and related apparatus involves utilization of exhaust air from the conventional corn dryer to constitute at least part of the warm air introduced into the steeping container.

In one broad aspect, the present invention is directed to a corn pretreatment process. In this regard, in one form the invention is a process for pre-treating corn which comprises the steps of: introducing corn into a steeping container conveying exhaust air from a first drying intersection in a corn dryer to the steeping container, selectively heating the exhaust air from the first drying intersection, conveying exhaust air from a second drying intersection in the corn dryer.

In another broad aspect, the present invention is directed to an apparatus for pre-treating corn. In this regard, in another form the invention is a corn pretreatment system comprising a corn dryer having a corn inlet at the top thereof into which pre-treated corn is fed, a steeping container having an inlet, a perforated floor mounted in the steeping container above the bottom thereof wherein the floor is perforated to allow an even uniform distribution of heat through the moist corn, an air inlet located below the floor, and a corn outlet located at the bottom thereof through which the pre-treated corn exits the container; and conduit means for conveying exhaust air from the corn dryer to the steeping container; and means for conveying pre-treated corn from the steeping container to the corn dryer.

In yet another broad aspect, the present invention is directed to a steeping container used in the process for pre-treating corn. In this regard, in yet another form the invention is a steeping container which comprises a top having an inlet into which corn is introduced, sides extending downwardly from the top and a bottom having an outlet from which corn exits the steeping container. The floor is mounted in the steeping container and is connected to the sides and extends downwardly toward the center and bottom of the container wherein the floor is perforated permitting air to pass upwardly in an even and uniform fashion through the perforations. An air inlet is locate below the floor.

It is an object of the present invention to provide an improved process, and its related apparatus, for pre-heating and slightly pre-drying corn or other grain.

It is yet another object of the invention to provide an improved process, and its related apparatus, for pre-heating and slightly pre-drying corn or other grain while avoiding excessive heating of the grain, thereby avoiding stress-cracking which occurs due to excessive heating.

DETAILED DESCRIPTION OF A PREFERRED EMBODIMENT

Figure 1:
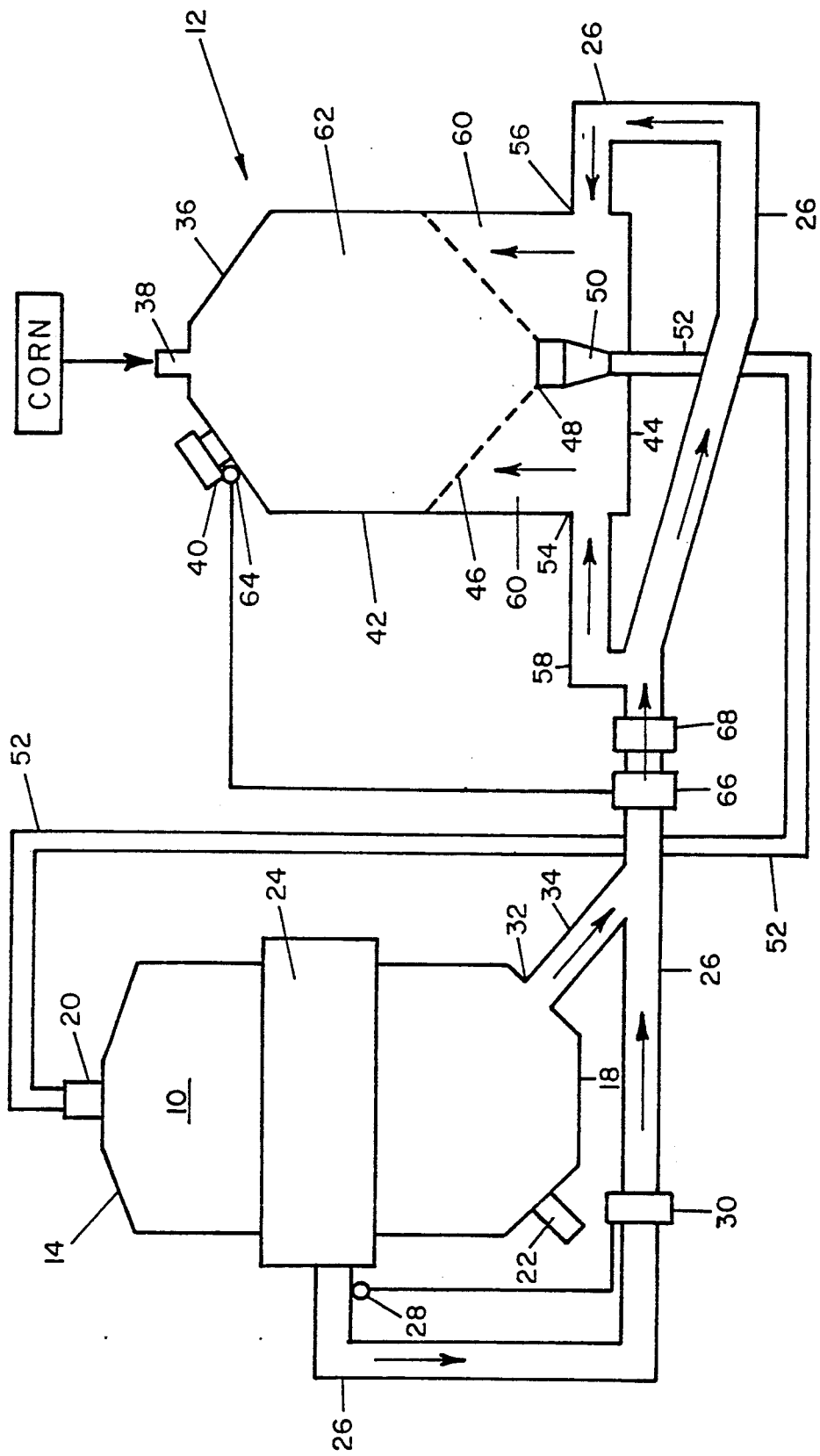
FIG. 1 is a mechanical schematic view of a specific embodiment of the invention utilized to dry corn or other grain.

Referring to the drawing, there is illustrated a system for drying corn. This system includes a conventional corn dryer generally designated as 10 and a steeping container generally designated as 12. As will become apparent from the description container hereinafter, the corn dryer 10 and steeping container 12 are operatively connected so as to provide for an apparatus utilized to practice the improved process for treating corn or other grain.

Corn dryer 10 includes a top portion 14, sides 16 and a bottom 18. Top 14 contains an inlet 20 therein through which corn enters the corn dryer 10. Bottom 18 contains an outlet 22 through which corn exits the corn dryer. Although not illustrated, the corn upon exiting the corn dryer is conveyed to a storage location.

Corn dryer 10 further includes an upper exhaust 24 through which relatively hot moist air is exhausted from corn dryer 10. As illustrated in the drawing, this relatively hot moist air exits upper exhaust 24 into a conduit 26. Conduit 26 provides direct communication between upper exhaust 24 and steeping container 12 as will be discussed in more detail hereinafter.

A humidity and temperature monitoring device 28 is operatively connected to a heater 30 contained in conduit 26. The humidity level and temperature of the relatively moist hot air exiting upper exhaust 24 into conduit 26 is monitored at the outlet of upper exhaust 24. In order to control the humidity level as well as the temperature of the air in conduit 26 which passes to steeping container 12, heater 30 is selectively activated to control the moisture content (or relative humidity) and temperature of the exhaust air passing to steeping container 12 from upper exhaust 24. As can be appreciated, the humidity and temperature monitoring device 28 and heater 30 are conventional pieces of equipment well known to those of ordinary skill in the art relevant to this invention. The humidity and temperature monitoring device 28 and heater 30 can be adjusted so that the level of moisture and the temperature of the air is selectively predetermined.

Corn dryer 10 further includes a lower exhaust 32 through which cool exhaust air, which is drier than the air exiting upper exhaust 24, exits corn dryer 10. The air exiting corn dryer 10 from the lower exhaust 32 enters into conduit 34 through which it is in communication with conduit 26.

Steeping container 12 includes a top 36 which has an inlet 38 contained therein as well as exhaust port 40. Steeping container 12 further includes a side wall 42 and a bottom 44. A generally frusto-conically shaped perforated floor 46 is mounted to the inside surface of side wall 42. Perforated floor 46 is constructed so as to allow air to pass upwardly therethrough, and yet prevent the fall of corn downwardly therethrough. Perforated floor 46 includes an outlet 48 into which the corn is directed and outlet 48 is connected to a hopper 50. Hopper 50 is in direct communication with inlet 20 of corn dryer 10 through conduit 52. Conduit 52 typically contains a conveyor therein.

Steeping container 12 includes a pair of inlets 54 and 56 located near the bottom 44 thereof. Air recycled from corn dryer 10 is received into steeping container 12 through inlets 54 and 56. The air is directly received through conduit 26 via inlet 56 and is received via inlet 54 through conduit 58 which connects inlet 54 to conduit 26. The arrows contained within the conduits illustrate the flow of air from corn dryer 10 to steeping container 12. It should be noted that air entering bottom volume 60 of steeping container 12 passes upwardly through perforated floor 46 and through the upper volume 62, in which the corn is contained, and exits steeping container 12 through exhaust port 40. A humidity and temperature monitoring device 64 is operatively connected to a heater 66 contained in conduit 26. The humidity level and temperature of the relatively moist cooler air exiting exhaust port 40 of steeping container 12 is monitored by device 64. In order to provide further control of the humidity level as well as the temperature of the air in conduit 26 which passes to steeping container 12, heater 66 is selectively activated to control the moisture content and temperature of the exhaust air from corn dryer 10 passing to steeping container 12. The humidity and temperature monitoring device 64 and heater 66 are conventional pieces of equipment well known to those of ordinary skill in the art relevant to this invention. The humidity and temperature monitoring device 6 and heater 66 can be adjusted so that the level of moisture and the temperature of the air is selectively predetermined.

During handling and drying of corn, a thin tissue-type layer on the corn kernel known as "bees wings" is knocked off and is transported by the air blowing through the dryer. Discharge of these bees wings from the drying apparatus into the atmosphere causes air pollution. The discharge of bees wings is to a certain extent alleviated by a bees wings burner 68 located in conduit 26 between corn dryer 10 and steeping container 12. Burner 26 heats the air to a preferred temperature of 140 degrees F. which results in disintegration of the bees wings.

In operation, corn is received through inlet 38 into steeping container 12 The corn is contained within upper volume 62 during the pre-treating process. As previously mentioned, air recycled from corn dryer 10 is received into the lower volume 60 of steeping container 12 through inlets 54 and 56. This warm air passes upwardly through perforated floor 46 and through the corn so as to uniformly and evenly dry it. The air then exits steeping container 12 through exhaust port 40.

Referring to the operation of corn dryer 10, corn which has been pre-treated is received through inlet 20. The corn is dried in a conventional manner known by those of ordinary skill in the relevant art to the invention. The corn dryer includes an upper exhaust 24 through which relatively hot moist air is exhausted from the corn dryer 10. This air is received into conduit 26 and communicated directly to lower volume 60 of steeping container 12 by means of conduit 26. As previously mentioned, the humidity and temperature of the air exiting upper exhaust 24 is monitored by the humidity and temperature monitoring device 28. Humidity and temperature monitoring device 28 is operatively connected to a heater 30 contained within conduit 26 whereby heater 30 is selectively activated depending upon the moisture content and temperature of the air leaving upper exhaust 24. It can be appreciated that this assembly controls the humidity and temperature of the exhaust air from the upper exhaust 24 which is conveyed to steeping container 12.

In addition, relatively dry cooler-exhaust air exhausts from corn dryer 10 through lower exhaust 32. This air passes through conduit 34 into conduit 26 and it is directly conveyed to the lower volume 60 of steeping container 12 through either conduit 26 or the combination of conduit 26 and conduit 58. It is typically the case that the air leaving corn dryer 10 through exhaust 32 does not have high levels of moisture and the temperature is such that an assembly to monitor the temperature and humidity of this exhaust air is not necessary. However, applicant contemplates that there could exist situations that would require such a monitoring assembly and it is within the scope of this invention to provide such a monitoring assembly, if necessary.

It should be appreciated that the invention described herein in terms of a preferred embodiment generally results in an improvement in the quality of corn dried therein over corn dried by certain other known high-temperature drying devices. In the past, certain dryers introduced relatively cool grain into a relatively hot dryer, which in some cases caused stress cracking of the skin of the corn kernel. This undesirable result is alleviated by the present invention which provides slow preheating of the kernels so that the temperature gradient within the kernel is small enough to prevent cracking. To achieve this desirable result of slow preheating, the corn is retained in the steeping container for a period between about two to about five hours. The typical ambient temperature of the corn is between about 30 to about 75 degrees F. The typical moisture content of the corn as it enters the steeping container 12 is between about 18% to about 38% moisture. The dimensions of the steeping container can be varied depending upon the size of the corn dryer. It is advantageous, however, to provide the steeping container with as large a diameter as practical because that reduces the power requirements of the fan which drives the heated air through the grain mass in the steeping container. A preferred flow rate for heated air through the steeping container is about 5 cubic feet per minute per bushel of corn. Since a typical capacity for a corn dryer is 1000 bushels per hour, the steeping container should preferably have a capacity of 4000 bushels to retain the corn therein for four hours.

The typical temperature of corn entering the corn dryer is between about 50 and 170 degrees F. The preferred temperature is about 140 degrees F. When the corn has been pre-heated to 140 degrees F., the moisture removal will be about 1.0 to about 2.5 percent. The rate or capacity of the corn dryer is directly proportional to the temperature of the pre-heated corn. Thus, the capacity of the corn dryer can be increased by pre-heating the corn to a higher temperature in the steeping container. The volume of air drawn from the corn dryer and directed into the steeping container can be varied. For instance, if the preferred flow rate is 5 cubic feet of air per minute and the preferred volume of the steeping chamber is 4000 bushels, then the volume of air drawn from the corn dryer into the steeping chamber is about 20,000 cubic feet per minute. Ideally, the air should enter the steeping chamber at about 140 degrees F.

The present invention improves the energy efficiency of corn drying operations, due to recycling of heat. According to one manner of speaking, it can be said that the present invention uses the initial heat delivered to the corn dryer three times. The first time is in the corn dryer itself when it encounters the pre-heated corn. The second time is in the steeping container where waste heat from the corn dryer pre-heats the corn which is at ambient temperature. The third time is in conjunction with the pre-heated corn, which contains heat energy, as it enters the corn dryer. Ideally, the air which exhausts the steeping container is relatively cool, i.e., only a little above ambient temperature. In that ideal case, all of the available heat shall have been used by the system.

Overall, it is apparent that applicant's invention is directed to an improved process, and its related apparatus for pre-treating corn or other grain. As can be appreciated, applicant's invention provides a way for exhaust air from a conventional corn dryer, which has in the past been essentially wasted, to be utilized in performing an important pretreatment process for corn prior to entering the corn dryer for the final drying operation. It is apparent that certain efficiencies are achieved by applicant's invention and its related apparatus.

What is claimed is:

1. A corn drying system comprising:
 a corn dryer having a corn inlet, a corn outlet, a hot air inlet and an exhaust air outlet;
 a steeping container having a bottom wall, a perforated floor mounted above and spaced from said bottom wall and defining a steeping chamber above said floor and an air plenum below said floor, a corn inlet located above said floor and communicating with said steeping chamber, an air inlet located below said floor and communicating with said air plenum, an air outlet located above said floor and communicating with said steeping chamber, and a corn outlet located at said bottom wall and communicating with said steeping chamber, said floor being perforated in a pattern that provides for even, uniform distribution of air form said air plenum through corn in said steeping chamber and thence through said air outlet;
 conduit means for conveying exhaust air from said exhaust air outlet of said corn dryer to said air inlet of said steeping container;
 conveying means for conveying corn from said corn outlet of said steeping container to said corn inlet of said corn dryer;
 said perforated floor is frusto-conically shaped so as to slope downwardly and radially inwardly.

2. The corn drying system of claim 1, in which said corn outlet passes through said perforated floor at the apex thereof.

3. The corn drying system of claim 1, and further including a temperature sensor located at the exhaust air outlet of said corn dryer operatively coupled to air heater means located in said conduit means for heating air passing therethrough.

4. The corn drying system of claim 1, and further including a humidity sensor located at the exhaust air outlet of said corn dryer operatively coupled to air heater means located in said conduit means for heating air passing therethrough.

5. The corn drying system of claim 1, and further including a bees wing burner means located in said conduit means for heating air passing therethrough and for disintegrating through heat bees wings passing therethrough.

6. A process for drying corn comprising the steps of:
 a) introducing corn into a steeping container;
 b) conveying exhaust air from a corn dryer to the steeping container and passing the exhaust air through a frusto-conically shaped perforated floor having a top edge and a bottom edge wherein the floor is sloping downwardly and inwardly from the top edge to the bottom edge in said steeping container and thence evenly and uniformly through said corn in the steeping container;
 c) conveying pre-heated corn from said steeping container into the corn dryer; and
 d) introducing heated air into said corn dryer and passing the heated air through the pre-treated corn.

7. The drying process of claim 4, wherein in the step of conveying said exhaust air from said corn dryer air is conveyed from a plurality of drying intersections of said corn dryer, and wherein exhaust air from each of the drying intersections is at a different temperature.

8. The drying process of claim 4, and further including the step of:
 supplementarily heating the exhaust air conveyed from said corn dryer prior to entrance into said steeping container.

9. The drying process or claim 4, and further including the step of:
 burning bees wings present in said conveyed air during conveying.

10. A steeping container for pre-heating grain comprising:

a top having an inlet for receipt of grain into said steeping container;
sides extending downwardly from the top;
a bottom having an outlet for exiting of grain from said steeping container;
a frusto-conical floor disposed in said steeping container and connected to said sides, said floor sloping downwardly and radially inwardly, said floor being perforated to permit air to pass upwardly therethrough evenly and uniformly over the surface area of said floor; and
an air inlet located below said floor.

11. A corn drying system comprising:
a corn dryer having a corn inlet, a corn outlet, a hot air inlet and an exhaust air outlet;
a steeping container having a bottom wall, a perforated floor mounted above and spaced from said bottom wall and defining a steeping chamber above said floor and an air plenum below said floor, a corn inlet located above said floor and communicating with said steeping chamber, an air inlet located below said floor and communicating with said air plenum, an air outlet located above said floor and communicating with said steeping chamber, and a corn outlet located at said bottom wall and communicating with said steeping chamber, said floor being perforated in a pattern that provides for even, uniform distribution of air from said air plenum through corn in said steeping chamber and thence through said air outlet;
conduit means for conveying exhaust air from said exhaust air outlet of said corn dryer to said air inlet of said steeping container;
conveying means for conveying corn from said corn outlet of said steeping container to said con inlet of said corn dryer; and
further including a temperature sensor located at the exhaust air outlet of said steeping container operatively coupled to air heater means located in said conduit means for heating air passing therethrough.

12. A corn drying system comprising:
a corn dryer having a corn inlet, a corn outlet, a hot air inlet and an exhaust air outlet;
a steeping container having a bottom wall, a perforated floor mounted above and spaced from said bottom wall and defining a steeping chamber above said floor and an air plenum below said floor, a corn inlet located above said floor and communicating with said steeping chamber, an air inlet located below said floor and communicating with said air plenum, an air outlet located above said floor and communicating with said steeping chamber, and a corn outlet located at said bottom wall and communicating with said steeping chamber, said floor being perforated in a pattern that provides for even, uniform distribution of air from said air plenum through corn in said steeping chamber and thence through said air outlet;
conduit means for conveying exhaust air from said exhaust air outlet of said corn dryer to said air inlet of said steeping container;
conveying means for conveying corn from said corn outlet of said steeping container to said con inlet of said corn dryer; and
further including a temperature sensor located at the exhaust air outlet of said steeping container operatively coupled to air heater means located in said conduit means for heating air passing therethrough.

* * * * *